May 26, 1953  A. R. AINSWORTH ET AL  2,640,133
APPARATUS FOR ELECTRIC ARC STUD WELDING
Filed March 27, 1950  2 Sheets-Sheet 1

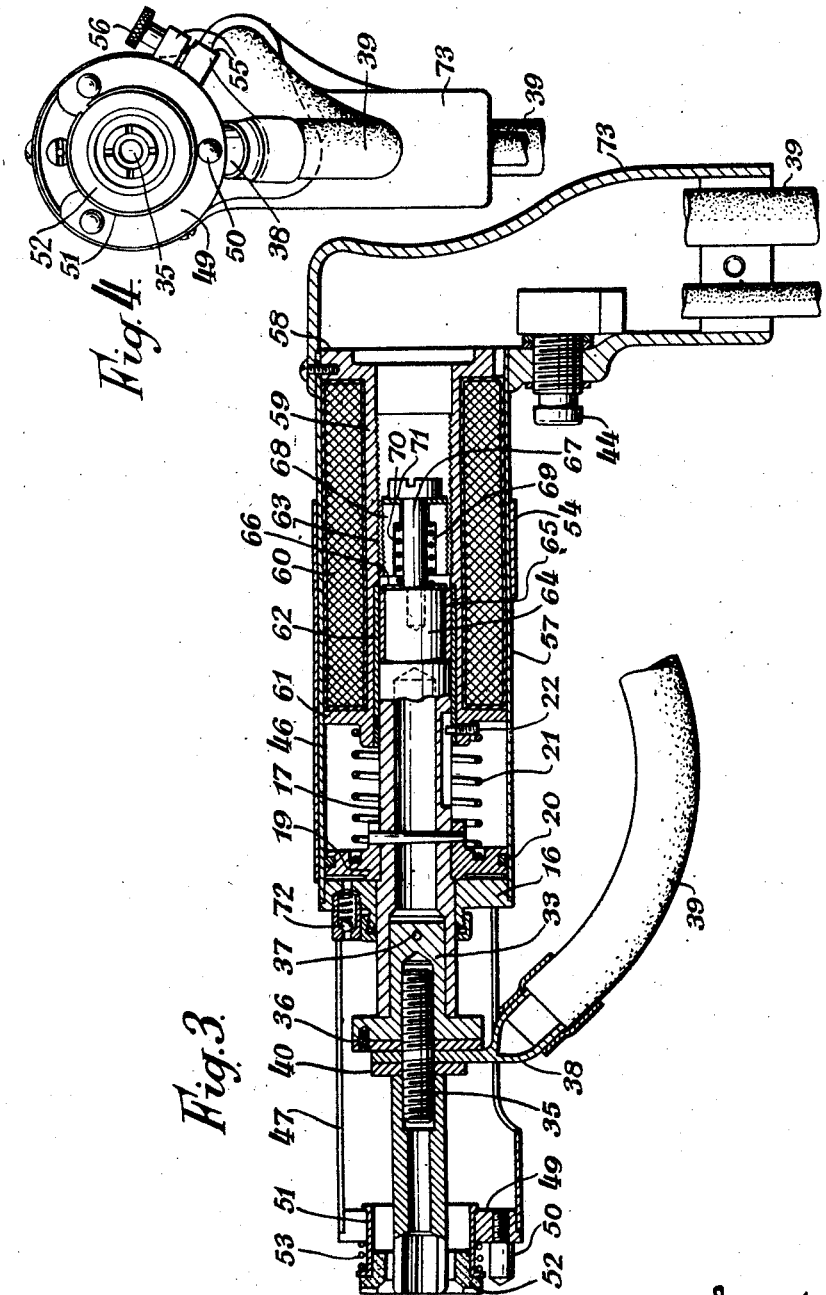

Patented May 26, 1953

2,640,133

UNITED STATES PATENT OFFICE 2,640,133

APPARATUS FOR ELECTRIC ARC STUD WELDING

Arthur Ratcliffe Ainsworth and James Binnie Miller, London, England, assignors to Cyc-Arc Limited, London, England, a British company Application March 27, 1950, Serial No. 152,136
In Great Britain April 6, 1949

12 Claims. (Cl. 219—4)

This invention relates to apparatus for the electric arc welding of metal or alloy studs, tubes, rivets, rods and the like (hereinafter termed "studs") to metal or alloy plates, strips, bodies or the like (hereinafter termed "plates"). The apparatus is of the type in which the stud chuck, after being charged with a stud, is moved relatively to the body of the apparatus against an opposing force on the butting of the stud upon the plate to which it is to be welded as the apparatus is set in a determined position in relation to the plate, the apparatus being provided with operating means whereby the stud chuck carrier may be retracted by force through a limited distance from the plate for the striking of an arc between the stud and the plate. While it is essential to determine precisely the extent of the said limited distance, it is desirable that the disposition of the stud chuck carrier in relation to the body of the apparatus after the butting of the stud upon the plate shall be variable over a considerable range, in order that differing lengths of studs may be welded in succession without necessity for adjustment of any of the elements of the apparatus.

The invention has among its objects to facilitate the welding of studs of differing lengths without the preliminary adjustment of any of the elements of the apparatus, to provide simple and effective means to retain the stud chuck carrier in any adjusted position in relation to the body of the apparatus, to provide means whereby the distance between the stud and the plate for the striking of the arc may be determined irrespective of the relative disposition of the stud chuck carrier and the body of the apparatus, to provide a light weight portable or hand tool that may be manufactured at a low cost and generally to provide an improved apparatus that may be small and compact in form while having a considerable working capacity.

According to the invention the apparatus comprises a stud chuck carrier having a wide range of movement in relation to the body and consisting of at least two parts that are coupled together in a manner to permit relative movement of the parts to a degree represented by the determined length of the arc between the stud and the plate at striking and so that the parts always tend to take up the disposition in which such relative movement is possible and electromagnetically operating means for effecting the frictional engagement and retention of the stud chuck carrier in any position in relation to the body into which it may have been moved by the butting of the stud upon the plate when the apparatus is set in the operative position in relation to the plate.

In an apparatus in which the retraction of the stud chuck carrier for the striking of the arc is effected by the movement of a solenoid core on energisation of the solenoid, the stud chuck carrier conveniently comprises the said core and a clutch member or members coupled to the said core in the required manner and adapted to be subjected to the frictional restraint necessary to arrest the stud chuck carrier in the position which it has taken up on the setting of the apparatus in the operative position. The clutch member or members and the solenoid core thus form the coupled parts of the stud chuck carrier.

The frictional restraint may be imposed by providing in the body of the apparatus a clutch surface inclined to the surface of the co-acting clutch member, so that a space of wedge-like cross-section is formed between the two surfaces, and by interposing between the two surfaces a clutch element that is maintained out of contact with the surfaces by spring action and is moved into contact by pressure applied from the armature or core of the electro-magnetic operating means. In another form, the clutch member or members may be attracted magnetically into contact with a surface or surfaces lying parallel with the axis of travel of the stud chuck carrier on the energisation of the electro-magnetic operating means.

The function of retracting the stud chuck carrier and the function of imposing the frictional restraint may be performed by the same electro-magnetic means or by distinct electro-magnetic means.

The coupling of the parts of the stud chuck carrier is advantageously such that the extent of the movement of retraction of the stud chuck for the striking of the arc may be varied or adjusted.

The invention further comprises the features hereinafter described and claimed.

The invention is illustrated, by way of example, in the accompanying drawings of two constructions of portable or hand welding tool.

Figure 3 is a longitudinal section of a modified construction of hand tool according to the invention.

Figure 4 is a front elevation of the tool represented in Figure 3.

Figure 1:
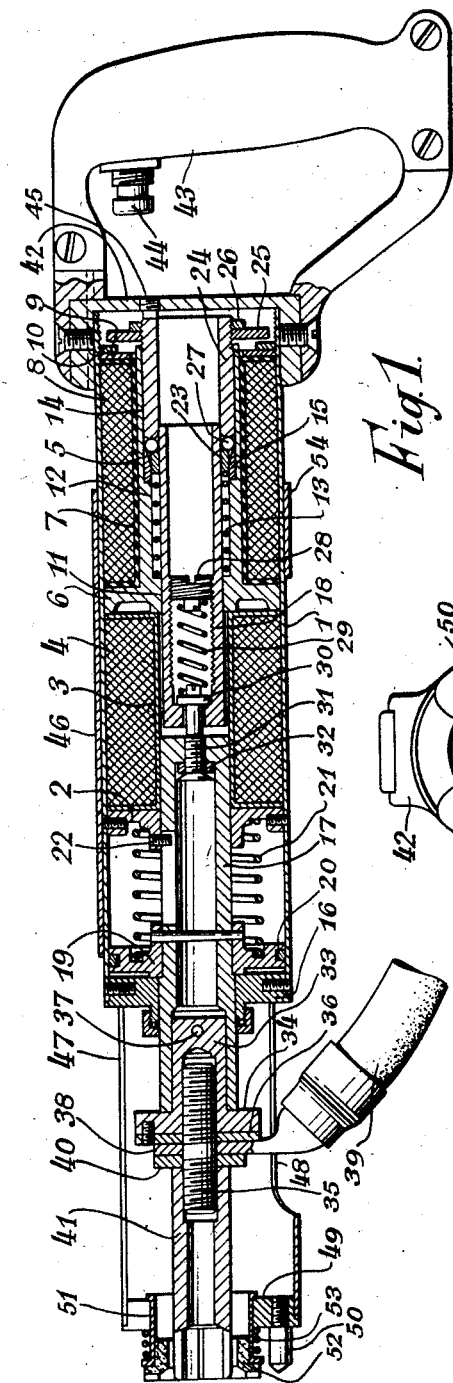
Figure 1 is a longitudinal section of a construction of tool according to the invention.
Figure 2:
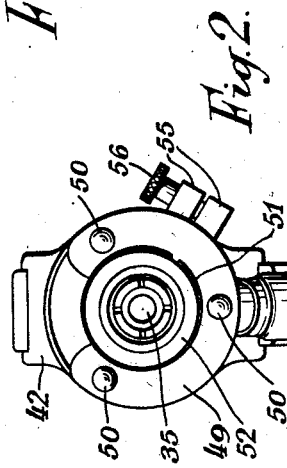
Figure 2 is a front elevation of the tool represented in Figure 1.

In carrying the invention into effect in the construction of a portable or hand tool provided with an arc-striking solenoid, as illustrated in Figures 1 and 2 of the accompanying drawings, a steel or like tubular casing or body 1 has an annular abutment member 2 secured within it at a distance from the forward end. The spool or former 3 of the solenoid coil 4 is fitted to the rear of the abutment member 2 and is followed by an inner lining member 5, of steel or other magnetic material, having at the forward end a massive flange 6 that rests upon the former 3 and closely fits the wall of the body 1. The lining member 5 is of a form to present between it and the wall of the body 1 an annular space in which is positioned the former 7, of insulating material, of a clutch coil 8. The former 7 is secured in position by a retaining ring 9, which closely fits about the rear end of the lining member 5, and a locking ring 10, each peripherally screw-threaded to engage an internal screw thread formed in the end of the wall of the body 1. The ring 10 is of magnetic material and forms a pole piece.

The lining member 5 has the bore formed in steps of three diameters, that of the smallest diameter, 11, having a diameter that is somewhat smaller than the diameter of the bores of the former 3 and of the abutment member 2. The second step, 12, is of a diameter to afford an annular space for the reception of a helical spring 13. The third step, 14, of the largest diameter, is adapted to receive upon the shoulder formed at the change of diameter a cone ring 15, of hardened steel.

The forward end of the body 1 is closed by a closure ring 16 having a bore of a diameter to receive the stud chuck carrier with a sliding fit and advantageously provided with a stuffing box and gland to retain packing about the stud chuck carrier.

The stud chuck carrier consists in the main of the solenoid core 17 and the clutch member 18. The solenoid core is a cylindrical body of magnetic material that may be, for the greater part of its length, solid but is advantageously bored or recessed except for the rear end, for reduction of weight. The forward part of the core is of a diameter to slide through the closure ring and its stuffing box, while the remainder is of a diameter to slide within the abutment member 2 and the former 3. A piston 19 is fitted to the core 17 at the shoulder formed by the change of diameter and is secured in position, for example, by a cotter pin. A piston ring 20 ensures an air-tight fit with the wall of the body 1 while the boss of the piston determines the outer limit of travel of the core from the body 1 and also ensures the presence of a residual air space or cushion between the piston and the closure ring 16. A helical spring 21 is confined between the piston and the abutment member 2 and thus provides the biassing force tending always to move the solenoid core to the outer limit of its travel. The core is conveniently prevented from rotating by means of a constraining pin 22 fitted in the boss or flange of the abutment member 2 and engaging a longitudinal slot or key-way in the core.

The clutch member 18 is a cylindrical body of magnetic material that is a sliding fit within the step 11 of the smallest diameter of the bore of the lining member 5 and therefore is separated from the bore of the former 3 by an annular air space. It passes freely through the spring 13 and, in the neighbourhood of the cone ring 15, slidably through an abutment ring 23, of non-magnetic material, and into the tubular armature 24 of the clutch coil 8. The armature 24 is of magnetic material and is a clearance fit within the step 14 of the bore of the lining member 5. At the rear end it is peripherally screw-threaded to receive an annular pole piece 25 and a lock nut 26. The pole piece 25 is adapted to co-act with the pole piece formed by the ring 10. Between the forward end of the armature 24 and the abutment ring 23 there are positioned several steel or like balls 27.

The clutch member is bored from the rear end for the greater part of its length, in two sections of differing diameter, the larger diameter being to the rear. At the change of diameter there is formed a screw thread to receive a screwed plug 28 which serves as an abutment for a helical spring 29 which, at the forward end, bears upon a collar 30 formed upon a coupling screw 31 that passes freely through a bore of small diameter in the forward end of the clutch member and has the forward part screw-threaded to engage a screw-threaded bore in the rear end of the core 17, and also, if required, a lock nut 32. The coupling screw 31 is of non-magnetic material. By adjustment of the screw in the core 17, it is possible to ensure that, under the pressure of the spring 29, the core is normally separated from the clutch member 18 by a distance representing the required lift or spacing of the stud from the plate to which it is to be welded for the striking of the arc.

The part of the core 17 that extends from the closure ring 16 is bored to receive the stem 33 of an insulator having a disc head 34 and which is itself bored to receive a screwed pin 35. A brass or like conducting disc 36 faces the head 34 and is pinned thereto. The insulator stem 33 is secured in the core 17 by screw thread engagement or by a pin 37. An eyelet 38 provided at the end of the welding cable 39 is secured in position upon the pin 35 between the disc 36 and a nut 40. The stud chuck 41 is received upon the end of the pin 35.

The rear end of the body 1 is closed by a cap 42 to which is secured the handle 43 provided with the press switch 44. The cap 42 may conveniently carry an adjustable stop pin 45 by which the air gap between the pole pieces 10 and 25 when not attracted may be determined.

The body 1 is advantageously fitted with a stout sheet metal cylindrical tool support 46 that is a sliding fit upon the body and, for the forward part, is cut away in diametrically opposite positions, as at 47 and 48, in the one case, to permit the ready fitting of studs in the stud chuck 41 and, in the other case, to permit the welding cable 39 to be connected to the stud chuck carrier. The forward end of the tool support 46 is fitted with an interrupted ring 49 supporting three equally spaced pins 50 whereby the apparatus may be set upon the plate in the operative position for the welding of the studs. The pins may be adjustable for length of protrusion from the ring 49. The latter conveniently serves to carry a short tubular ferrule clip or support 51, that is flanged outwardly at the lower end to form a seating for the ferrules 52 and as an abutment for a helical spring 53 positioned between the flange and the ring 49. The upper end of the clip or support 51 is also flanged outwardly or provided with a retaining nut, to prevent withdrawal of the clip from the ring 49. The lower end of the clip is split or slotted to afford resilience.

In order that the tool support 46 may be adjusted in position upon the body 1, the upper or rear end 54 is split and the two ends provided with lugs 55 for the reception of a clamping screw 56.

In operation, when the stud chuck 41 is charged with a stud and the apparatus is set so as to be supported by the pins 50 upon the plate to which the stud is to be welded, the contacting of the stud with the plate moves the stud chuck carrier freely into the body of the tool against the force of the spring 21, the core 17 and the clutch member 18 maintaining their spaced relation under the pressure of the spring 29 upon the collar 30. When the switch 44 is closed to initiate the welding operation, the clutch coil 8 and the solenoid coil 4 are energised. The armature 24 is thus attracted to reduce or close the air gap between the pole pieces 10 and 25 and presses the balls forwardly along the cone ring 15, so that they are caused to grip and immobilise the clutch member 18. The energisation of the solenoid coil 4 results in the retraction of the core 17 to the extent permitted by the gap between the core and the clutch member, thus moving the stud from the plate to the determined distance required for the striking of the arc. On the expiration of the determined duration of the arc, the control circuits are opened and the coil 8 and solenoid 4 de-energised. The spring 13 is thus permitted to move the balls 27 and the armature 24 rearwardly, so that the clutch member is released, and the stud chuck carrier is moved forwardly by the spring 21 to carry the heated end of the stud into contact with the heated crater of the plate at a speed that may be determined by the dampening effect of the piston 19. The damping effect may be dependent upon the presence of a bleed hole or valve whereby the passage of air into and from the space between the piston and the closure ring 16 may be controlled.

If the clutch coil 8 and the solenoid coil 4 are included in the same control circuit, it is advisable to ensure that the former is energised more rapidly than the latter. For example, sufficient retardation in the operation of the solenoid coil 4 may be secured by forming the coil former 3 of a conductive metal or alloy, such as brass, so that eddy currents may be induced therein for the purpose of momentarily retarding the operation of the solenoid. The solenoid coil may alternatively be included in a control circuit that is dependent for its closure upon the passage of current in the control circuit containing the clutch coil 8.

It is advantageous, but not essential, to provide the solenoid core and the clutch member of circular cross-section. If they are non-circular, the cone ring or tapering bore may be replaced by a series of plane inclined surfaces that may co-operate with wedges, segmental blocks or rollers as the clutch elements. If the clutch member is adapted to slide in a guide or guides, a single inclined surface and a single clutch element may suffice to impose the required restraint upon the clutch member.

Figures 3 and 4 illustrate a simplified construction of portable or hand tool in which a single coil functions as the clutch coil and the solenoid coil and in which a differing form of electromagnetic frictional restraint is imposed upon the stud chuck carrier. Since, however, much of the construction is similar in detail to that of the tool represented in Figures 1 and 2, the distinguishing features only will be described in detail and like parts will be indicated by the same reference numerals.

The body 57 is closed at the forward end by the closure ring 16 and at the rear end by the massive flange 58 of the former 59, of magnetic material, of the coil 60. The forward flange 61 of the former 59 takes the place of the abutment member 2 and is formed accordingly as an abutment for the spring 21. The diameter of the bore is such as to permit the core 17 to move therein, but the forward part is recessed for the reception of a lining 62 of non-magnetic material, so that the core does not adhere. The rear part of the bore is roughened or scored, preferentially circumferentially, as at 63.

The core 17 is provided with a solid extension 64 that remains always within the bore of the former 59 and is fitted with a sleeve 65 and, if required, a washer 66, or a cap, of non-magnetic material. The said solid extension 64 is bored axially and tapped to receive a headed screw or bolt 67 that functions as the coupling element between the core and the clutch member. The latter is a cylindrical body 68 of magnetic material fitting closely within the roughened surface 63 of the bore of the former 59 and divided into two parts of substantially semi-circular cross-section. The two-part body is bored to be a sliding fit upon the screw or bolt 67 and the forward face is recessed at 69 to form an annular space about the screw or bolt 67, in which space is disposed a helical spring 70 confined between the washer 66, or cap, of the extension 64 and the rear end of the body 68. A washer 71, of non-magnetic material, is advantageously disposed under the head of the screw or bolt 67. The spacing of the body 68 from the core 17 under the pressure of the spring 70 represents the lift of the stud from the plate for the striking of the arc. The distance may be readily adjusted by adjustment of the screw or bolt 67 in the end of the core 17. The peripheral surface of the two-part body 68 is roughened in a manner similar to the roughening of the bore of the former 59.

Figure 3 illustrates the provision on the closing ring 16 of a non-return ball or other spring valve 72 for the admission of air to the space between the closing ring and the piston 19, to facilitate the inward movement of the stud chuck carrier and to effect a dampening of the return movement of the stud to the plate, to avoid impact of the stud upon the plate.

The handle 73 is secured to the rear end of the body 57 and to the flange 58 of the former 59. It is fitted with the switch 44, which may be of any required type, and receives the welding circuit cable 39, as well as the cable of the control circuit. The cable 39 passes from a lateral boss of the handle to the eyelet 38.

In operation, when the coil 60 is energised, the parts of the clutch member 68 are instantly attracted by the former 59 and move into engagement therewith, thus immobilising the stud chuck carrier. At the same time the core 17 is caused to move rearwardly to the extent permitted to it and thus lifts the stud from contact with the plate.

It is not essential for the former 59 to be wholly of magnetic material. The magnetic material may form a lining to the former, either wholly or in part. The clutch member, also, may be provided in more than two parts, so long as the said parts, or certain of them, have a limited freedom of lateral movement in relation to the coupling element to permit of the attraction into contact with the surface of the coil former. Such parts may be mounted in a carrier.

The invention is not limited to the features of construction hereinbefore described. Thus, in the construction according to Figures 1 and 2, the rear of the bore of the clutch member may be adapted as a dash-pot, by mounting in an axial boring in the closing cap 42 the outer end of a hollow piston rod having, at the inner end, a leather or like cup washer that bears upon the wall of the bore and is retained, for example, by metal washers disposed at the two sides and a retaining nut upon the forward end of the piston rod. The outer end of the piston rod may be closed by a plug or by an adjustable valve affording a controlled entry for air.

It will also be understood that the means for effecting frictional restraint comprising clutch elements may be used with a single operating coil, providing that the required sequence of operation of the clutch members and elements and of the solenoid coil is maintained. Similarly, the magnetic type of clutch member may be used in connection with an operating coil distinct from the solenoid.

We claim:

1. Electric arc welding apparatus for welding studs to plates, comprising a body, a stud chuck carrier axially movable in the body and consisting of two co-axial relatively movable parts, a coupling member connecting the two parts and determining the maximum distance of their possible separation and yieldable means acting to separate the parts to such maximum distance, clutch means within the body and operable to effect clutching engagement with the inner part of the stud chuck carrier to immobilize the said inner part and electromagnetic means for attracting the outer part into contact with the inner part.

2. Electric arc welding apparatus for welding studs to plates, comprising a body, a stud chuck carrier axially movable in the body and consisting of two co-axial relatively movable parts, a coupling member connecting the parts and determining the maximum distance of separation of the two parts and yieldable means acting to separate the parts to such maximum distance, clutch means within the body operable to clutch and immobilize the inner part of the stud chuck carrier in any position into which it is moved when the apparatus is set in the operative position in relation to the plate to which a stud carried in the chuck is to be welded and the stud butts upon the plate, and means in the body for moving the outer part of the stud chuck carrier into contact with the inner part.

3. Electric arc welding apparatus for welding studs to plates, comprising a body, a stud chuck carrier mounted in the body for movement in the direction of the axis of the chuck and consisting of inner and outer co-axial parts, a coupling member connecting the two parts with limited freedom of relative axial movement and yieldable means acting on and forcing the two parts to the maximum distance of separation, which distance represents the length at striking of the arc to be struck between the stud in the chuck and the plate to which the stud is to be welded, yieldable means forcing the stud chuck carrier outwardly from the body, clutch means positioned in the body and operable to clutch and immobilize the inner part of the stud chuck carrier and electro-magnetic means in the body for operating the clutch means and attracting the outer part of the stud chuck carrier into contact with the inner part.

4. Electric arc welding apparatus for welding studs to plates, comprising a body, a stud chuck carrier axially movable in the body and consisting of inner and outer co-axial parts, a coupling member connecting the two parts and affording thereto limited freedom of relative axial movement and yieldable means tending always to separate the parts to the maximum distance apart, clutch means within the body adapted to clutch and immobilize the inner part of the stud chuck carrier in any predetermined position in relation to the body and a solenoid within the body, which solenoid, when energised, attracts, as a core, the outer part of the stud chuck carrier into contact with the inner part.

5. Electric arc welding apparatus for welding studs to plates, comprising a body, a stud chuck carrier axially movable in the body and consisting of inner and outer co-axial parts, an adjustable coupling member connecting the two parts with limited but regulatable freedom of relative axial movement and yieldable means tending always to separate the parts to the maximum distance apart, clutch means in the body adapted to immobilize the inner part in any predetermined position in relation to the body and electro-magnetic means for operating the clutch means and for moving the outer part of the stud chuck carrier to its inner limit of movement relatively to the inner part.

6. Electric arc welding apparatus for welding studs to plates, comprising a body, a stud chuck carrier axially movable in the body and consisting of an inner clutch part and an outer core part, a coupling element connecting the two parts with limited freedom of relative axial movement and yieldable means tending always to dispose the parts at the maximum distance apart, which distance represents the length at striking of an arc to be struck between a stud in the chuck and the plate to which the stud is to be welded, yieldable means tending always to move the stud chuck carrier outwardly from the body, clutch means within the body adapted to immobilize the clutch part in any position into which it is moved when the apparatus is set in the operative position in relation to the plate to which the stud in the chuck is to be welded and the stud butts upon the plate and electro-magnetic means comprising at least one coil in the body surrounding the path of movement of the stud chuck carrier and serving, when energised, to operate the clutch means and to move the outer core part to its inner limit of movement relatively to the inner part.

7. Electric arc welding apparatus for welding studs to plates according to claim 6, in which the electro-magnetic means comprise a clutch coil and a solenoid, which, when energised, respectively effect the operation of the clutch means and move the outer core part to the inner limit of its travel relatively to the inner part, the coil and solenoid being co-axially disposed.

8. Electric arc welding apparatus for welding studs to plates according to claim 6, in which the electro-magnetic means comprise a solenoid coil, which, when energised, effects the operation of the clutch means and moves the outer core part to the inner limit of its movement relatively to the inner part.

9. Electric arc welding apparatus for welding studs to plates, according to claim 6, in which the clutch means for co-operation with the inner clutch part of the stud chuck carrier comprise at least one surface in the body inclined to the surface of the said part, a clutch element disposed between the two surfaces, a spring acting upon the clutch element to throw it out of contact with the two surfaces and an armature in a position in relation to the clutch element opposed to the spring and moving to press the clutch element into engagement with the two surfaces against the action of the spring, on energisation of the electro-magnetic means.

10. Electric arc welding apparatus for welding studs to plates, according to claim 6, in which the clutch means comprise an annular coned surface within the body and surrounding the inner clutch part of the stud chuck carrier, a series of clutch elements disposed between the coned surface and the surface of the said inner part, a spring-pressed abutment element upon which the clutch elements rest out of contact with the two surfaces and an annular armature disposed in an opposed position with reference to the abutment element and pressing the clutch elements into contact with the two surfaces, on energisation of the electro-magnetic means.

11. Electric arc welding apparatus for welding studs to plates, according to claim 6, in which the clutch means comprise a magnetic contact surface in the body, which, on energisation of the electro-magnetic means, becomes active to attract the inner clutch part of the stud chuck carrier into contact therewith, by limited movement transverse to the axis.

12. Electric arc welding apparatus for welding studs to plates, according to claim 6, in which the clutch means comprise a magnetic contact surface in the body surrounding the inner part of the stud chuck carrier and that the said inner part comprises at least two sections that are divided one from another on planes radial to the axis of the part and that are adapted for separation in directions transverse to the said axis, for attraction into contact with the contact surface of the body, which becomes active to effect such attraction on energisation of the electro-magnetic means.

ARTHUR RATCLIFFE AINSWORTH.
JAMES BINNIE MILLER.

References Cited in the file of this patent

UNITED STATES PATENTS

| Number | Name | Date |
|---|---|---|
| 2,265,169 | Hughes et al. | Dec. 9, 1941 |
| 2,467,723 | Barlow | Apr. 19, 1949 |

FOREIGN PATENTS

| Number | Country | Date |
|---|---|---|
| 584,695 | Great Britain | Jan. 21, 1947 |
| 592,084 | Great Britain | Sept. 8, 1947 |
| 601,567 | Great Britain | May 7, 1948 |
| 619,962 | Great Britain | Mar. 17, 1949 |